(12) United States Patent
Fu et al.

(10) Patent No.: US 9,667,375 B2
(45) Date of Patent: *May 30, 2017

(54) CHANNEL ESTABLISHMENT METHOD AND DEVICE

(71) Applicant: ZTE CORPORATION, Shenzhen, Guangdong Province (CN)

(72) Inventors: Xihua Fu, Guangdong Province (CN); Xinling Zhang, Guangdong Province (CN)

(73) Assignee: ZTE CORPORATION, Nanshan, Shenzhen (CN)

( * ) Notice: Subject to any disclaimer, the term of this patent is extended or adjusted under 35 U.S.C. 154(b) by 65 days.

This patent is subject to a terminal disclaimer.

(21) Appl. No.: 14/404,923

(22) PCT Filed: May 6, 2013

(86) PCT No.: PCT/CN2013/075208
§ 371 (c)(1),
(2) Date: Dec. 1, 2014

(87) PCT Pub. No.: WO2013/178006
PCT Pub. Date: Dec. 5, 2013

(65) Prior Publication Data
US 2015/0333861 A1 Nov. 19, 2015

(30) Foreign Application Priority Data
Jun. 1, 2012 (CN) .......................... 2012 1 0179108

(51) Int. Cl.
*H04J 14/02* (2006.01)
*H04Q 11/00* (2006.01)

(52) U.S. Cl.
CPC ...... *H04J 14/0227* (2013.01); *H04Q 11/0062* (2013.01); *H04J 2203/0069* (2013.01); *H04Q 2011/0064* (2013.01)

(58) Field of Classification Search
CPC ... H04J 14/0227; H04J 14/0241; H04J 14/023
See application file for complete search history.

(56) References Cited

U.S. PATENT DOCUMENTS

| | | | | |
|---|---|---|---|---|
| 2011/0188447 | A1* | 8/2011 | Wang | H04L 5/0053 370/328 |
| 2011/0205890 | A1* | 8/2011 | Kurita | H04L 45/122 370/230 |

(Continued)

FOREIGN PATENT DOCUMENTS

| | | |
|---|---|---|
| CN | 1620771 A | 5/2005 |
| CN | 101030939 | 9/2007 |

(Continued)

OTHER PUBLICATIONS

International Search Report (Form EPO/1503) for International Application No. EP13796523 dated Dec. 15, 2015.

(Continued)

*Primary Examiner* — Dzung Tran
(74) *Attorney, Agent, or Firm* — Koppel, Patrick, Heybl & Philpott

(57) ABSTRACT

A channel establishment method and device are provided. The method includes: establishing a media channel between a first node and a second node; establishing a signal channel between a third node and a fourth node after the media channel is established, wherein the signal channel passes a frequency slot matrix of one or more intermediate nodes between the third node and the fourth node and a traffic engineering link between any two nodes; and allocating frequency spectrum to the signal channel from available frequency spectrum of the traffic engineering link, wherein the frequency spectrum includes multiple split frequency spectrums which bear one optical channel and each of which contains a plurality of optical carriers or only contains a single optical carrier. The solution can address the problem (Continued)

as to how to effectively plan and manage frequency spectrum for an introduced flexible grid technology and improve waveband frequency spectrum efficiency.

20 Claims, 7 Drawing Sheets

(56) References Cited

U.S. PATENT DOCUMENTS

| | | | |
|---|---|---|---|
| 2012/0201541 A1* | 8/2012 | Patel | H04J 14/0212 398/58 |
| 2012/0224851 A1* | 9/2012 | Takara | H04B 10/0793 398/45 |
| 2013/0308945 A1* | 11/2013 | Dhillon | H04Q 11/0003 398/48 |

FOREIGN PATENT DOCUMENTS

| | | |
|---|---|---|
| CN | 102439886 A | 5/2012 |
| WO | WO2011113679 A1 | 9/2011 |

OTHER PUBLICATIONS

Article titled, "Elastic Optical Networking: A New Dawn for the Optical Layer?" by Ori Gerstel, et al. dated Feb. 2012.
Article titled, "Experimental assessment of a combined PCE-RMA and distributed spectrum allocation mechanism for GMPLS Elastic CO-OFDM Optical Networks" by Ramon Casellas, et al. dated Jan. 23, 2012.
Article titled, "Dynamic Spectrum Allocation to GMPLS-controlled Elastic Optical Networks" by Raul Munoz, et al. dated Jul. 22, 2011.
International Search Report (Form PCT/ISA/210) for International Application No. PCT/CN2013/075208 mailed Aug. 8, 2013.

* cited by examiner

CHANNEL ESTABLISHMENT METHOD AND DEVICE

TECHNICAL FIELD

The disclosure relates to the communication field and more particularly to a channel establishment method and device.

BACKGROUND

With the requirement on the bandwidth of a bearer network becoming higher and higher, a beyond-100 G technology becomes a solution to meeting the requirement for higher bandwidth; the Wavelength Division Multiplexing (WDM) of the conventional 50 GHz fixed grid cannot provide a sufficient spectrum width to realize a beyond-100 G technology, no matter a 400 G technology or a 1 T technology.

In view of the defects of the fixed grid, a flexible grid capable of providing wider bandwidth is needed. In related technologies, beyond-100 G multi-rate hybrid transmission and the flexibility of the modulation format for beyond-100 G transmission have different requirements on channel bandwidth. If a proper bandwidth is customized for each channel, then the bandwidth of a system can be fully used, thereby generating a flexible grid system.

The requirement for an ultra high-speed WDM system brought by the demand for higher and higher bandwidth leads to a demand for a flexible grid technology. Moreover, the transmission rate of single-carrier is close to the limit of optical transmission capacity, the transmission capacity of optical fiber can be improved by using multi-carrier, however, how to effectively plan and manage frequency spectrum and how to realize the compatibility to existing systems remain to be solved.

As to the problem of how to effectively plan and manage frequency spectrum for an introduced flexible grid technology existing in related technologies, no effective solution have been proposed.

SUMMARY

A channel establishment method and device are provided in the embodiments of the disclosure to at least address the problem of how to effectively plan and manage frequency spectrum for an introduced flexible grid technology.

In accordance with an embodiment of the disclosure, a channel establishment method is provided which includes: establishing a media channel between a first node and a second node, wherein the first node is the source node of the media channel, the second node is the destination node of the media channel, the media channel passes a frequency slot matrix of one or more intermediate nodes between the first node and the second node and an optical fiber between any two nodes, and the media channel supports at least one optical channel; establishing a signal channel between a third node and a fourth node after the media channel is established, wherein the third node is the source node of the signal channel, the fourth node is the destination node of the signal channel, and the signal channel passes a frequency slot matrix of one or more intermediate nodes between the third node and the fourth node and a traffic engineering link between any two nodes; and allocating frequency spectrum to the signal channel from the available frequency spectrum of the traffic engineering link, wherein the frequency spectrum allocated includes a plurality of split 50 GHz frequency spectrums which bear one optical channel and each of which only contains a single optical carrier.

In the described embodiment, the frequency spectrum of the media channel is allocated from the available frequency spectrum of the optical fiber.

In the described embodiment, the traffic engineering link is formed in the following manner: after the media channel is successfully established, the traffic engineering link, which supports at least one signal channel, and the available frequency spectrum of which is the same as the frequency spectrum of the media channel, is formed between the first node and the second node in an upper-layer signal network which is corresponding to a lower-layer media network where the media channel exists.

In the described embodiment, the traffic engineering link is formed in the following manner: in a case where any two nodes are directly connected with each other merely by an optical fiber, the traffic engineering link, the available frequency spectrum of which is the same as available frequency spectrum of the optical fiber, is formed in an upper-layer signal network which is corresponding to the lower-layer media network where the media channel exists.

In the described embodiment, after the signal channel is established between the third node and the fourth node, the method further includes: switching, on the nodes the signal channel passes, the plurality of split 50 GHz frequency spectrums which bear one optical channel.

In the described embodiment, after the media channel is established between the first node and the second node, the method further includes: switching one or more frequency slots on the nodes the media channel passes.

In the described embodiment, the frequency slot is a fixed or flexible grid.

In the described embodiment, the available frequency spectrum of the optical fiber is released to a control plane via a routing protocol in the lower-layer media network where the media channel exists, wherein the optical fiber supports at least one frequency slot; and the available frequency spectrum of the traffic engineering link is released to a control plane via a routing protocol in the upper-layer signal network which is corresponding to the lower-layer media network, wherein the traffic engineering link supports at least one optical channel.

In the described embodiment, the routing protocol includes OSPF-TE and ISIS-TE.

In accordance with another embodiment of the disclosure, another channel establishment method is provided which includes: establishing a signal channel between a third node and a fourth node, wherein the third node is the source node of the signal channel, the fourth node is the destination node of the signal channel, and the signal channel passes a frequency slot matrix of one or more intermediate nodes between the third node and the fourth node and a traffic engineering link between any two nodes; and allocating frequency spectrum to the signal channel from the available frequency spectrum of the traffic engineering link, wherein the frequency spectrum allocated includes a plurality of split 50 GHz frequency spectrums which bear one optical channel and each of which only contains a single optical carrier.

In accordance with still another embodiment of the disclosure, a channel establishment device is provided which includes: a first establishment module configured to establish a media channel between a first node and a second node, wherein the first node is the source node of the media channel, the second node is the destination node of the media channel, the media channel passes a frequency slot matrix of one or more intermediate nodes between the first node and the second node and an optical fiber between any two nodes, and the media channel supports at least one optical channel; a second establishment module configured to establish a signal channel between a third node and a fourth node after the media channel is established, wherein the third node is the source node of the signal channel, the fourth node is the destination node of the signal channel, and the signal channel passes a frequency slot matrix of one or more intermediate nodes between the third node and the fourth node and a traffic engineering link between any two nodes; and a first allocation module configured to allocate frequency spectrum to the signal channel from the available frequency spectrum of the traffic engineering link, wherein the frequency spectrum allocated includes a plurality of split 50 GHz frequency spectrums which bear one optical channel and each of which only contains a single optical carrier.

In the described embodiment, the device further includes: a forming module configured to, after the media channel is successfully established by the first establishment module, form, between the first node and the second node, a traffic engineering link which supports at least one signal channel and the available frequency spectrum of which is the same as the frequency spectrum of the media channel in an upper-layer signal network which is corresponding to the lower-layer media network where the media channel exists.

In accordance with yet another embodiment of the disclosure, another channel establishment device is provided which includes: a third establishment module configured to establish a signal channel between a third node and a fourth node, wherein the third node is the source node of the signal channel, the fourth node is the destination node of the signal channel, and the signal channel passes a frequency slot matrix of one or more intermediate nodes between the third node and the fourth node and a traffic engineering link between any two nodes; and a second allocation module configured to allocate frequency spectrum to the signal channel from the available frequency spectrum of the traffic engineering link, wherein the frequency spectrum allocated includes a plurality of split 50 GHz frequency spectrums which bear one optical channel and each of which only contains a single optical carrier.

In the embodiments of the disclosure, a media channel is established between a first node and a second node, a signal channel is established between a third node and a fourth node after the media channel is successfully established, frequency spectrum is allocated to the signal channel from the available frequency spectrum of a traffic engineering link, and the frequency spectrum allocated includes a plurality of split 50 GHz frequency spectrums which bear one optical channel and each of which contains one or more optical carriers. As a result, the separation of a media channel from a signal channel provides hierarchical management. Moreover, as a signal channel can be born by a plurality of split 50 GHz frequency spectrums each of which includes one or more optical carriers, hierarchical management and planning is provided from the point of view of frequency spectrum management. This frequency spectrum management mode can improve the utilization rate of frequency spectrum, rationally plan frequency spectrum resource and achieve an extremely high waveband frequency spectrum efficiency while being compatible to the 50 GHz spacing technology adopted by existing 10 G/40 G/100 G transmission technologies after a flexible grid technology is introduced into a beyond-100 G system, thus protecting the investment of operator, improving the overall frequency spectrum utilization rate of the network of the operator and effectively reducing the network management and investment cost of the operator.

BRIEF DESCRIPTION OF THE DRAWINGS

The accompanying drawings described here are provided for a better understanding of the disclosure and constitute one part of the disclosure, and the exemplary embodiments of the disclosure and description thereof are illustrative of the disclosure but are not to be construed as limiting the disclosure. In the accompanying drawings.

DETAILED DESCRIPTION OF THE EMBODIMENTS

The disclosure is described below in detail with reference to accompanying drawings when read in conjunction with embodiments. It should be noted that embodiments of the disclosure and the features thereof can be combined with each other if no conflict is caused.

It is mentioned in related technologies that for beyond-100 G bandwidth, the requirement for an ultra high-speed WDM system brought by the demand for higher and higher bandwidth leads to a demand for a flexible grid technology, however, how to effectively plan and manage frequency spectrum and how to realize the compatibility of the introduced flexible grid technology to existing systems remain to be solved.

Figure 1:
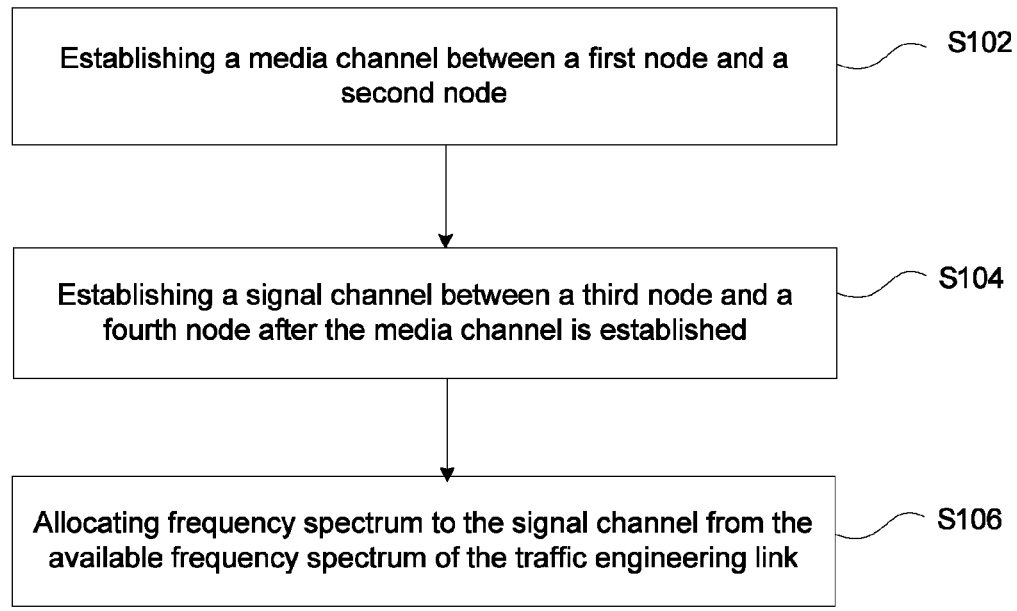
FIG. 1 is a flowchart illustrating the processing flow of a first channel establishment method according to an embodiment of the disclosure.

To address the technical problems above, a channel establishment method is provided in an embodiment of the disclosure, and as shown in FIG. 1, the method specifically includes:

Step S102: establishing a media channel between a first node and a second node, wherein the first node is the source node of the media channel, the second node is the destination node of the media channel, the media channel passes a frequency slot matrix of one or more intermediate nodes between the first node and the second node and an optical fiber between any two nodes, and the media channel supports at least one optical channel;

Step S104: establishing a signal channel between a third node and a fourth node after the media channel is established;

wherein the third node is the source node of the signal channel, the fourth node is the destination node of the signal channel, and the signal channel passes a frequency slot matrix of one or more intermediate nodes between the third node and the fourth node and a traffic engineering link between any two nodes;

Step S106: allocating frequency spectrum to the signal channel from the available frequency spectrum of the traffic engineering link.

The frequency spectrum allocated includes a plurality of split 50 GHz frequency spectrums which bear one optical channel and each of which only contains a single optical carrier.

In the embodiment of the disclosure, a media channel is established between a first node and a second node, a signal channel is established between a third node and a fourth node after the media channel is successfully established, frequency spectrum is allocated to the signal channel from the available frequency spectrum of a traffic engineering link, and the frequency spectrum allocated includes a plurality of split 50 GHz frequency spectrums which bear one optical channel and each of which includes one or more optical carriers. As a result, the separation of a media channel from a signal channel provides hierarchical management, moreover, as a signal channel can be born by a plurality of split 50 GHz frequency spectrums each of which includes one or more optical carriers, hierarchical management and planning is provided from the point of view of frequency spectrum management. This frequency spectrum management mode can improve the utilization rate of frequency spectrum, rationally plan frequency spectrum resource and achieve an extremely high waveband frequency spectrum efficiency while being compatible to the 50 GHz spacing technology adopted by existing 10 G/40 G/100 G transmission technologies after a flexible grid technology is introduced into a beyond-100 G system, thus protecting the investment of operator, improving the overall frequency spectrum utilization rate of the network of the operator and effectively reducing the network management and investment cost of the operator.

A beyond-100 G network system can be managed using the channel establishment method provided in the disclosure. For example, the operator expects to establish high-bandwidth media channels (e.g. 500 GHz) which subsequently support a plurality of low-bandwidth signal channels which directly support an Optical Data Unit (ODU)/Optical Channel Transport Unit (OTU)/Optical channel (OCh) signal, or the media channel supports a plurality of low-bandwidth signal channels each of which is born by a plurality of split 50 GHz frequency spectrums each including only one carrier, by means of the frequency spectrum management mode, the operator can establish a high-bandwidth media channel between two nodes of an optical network based on a preset frequency spectrum planning, the channel can be shared by a plurality of signal channels, thus, there is no need to manage signal channels in the network where the media channel exists. Moreover, an optical channel signal can be born by a plurality of split frequency slots each of which includes one or a plurality of optical carriers, thus greatly improving the bandwidth transmission limit of an optical fiber.

The frequency spectrum of the media channel is allocated from the available frequency spectrum of the optical fiber.

In the implementation process, each split frequency spectrum mentioned in Step S106 is also referred to as a distributed frequency spectrum which has similar meaning with split spectrum In an example embodiment, the traffic engineering link mentioned in Step S104 is formed in the following manner: the traffic engineering link, which supports at least one signal channel, and the available frequency spectrum of which is the same as the frequency spectrum of the media channel, is formed between the first node and the second node in an upper-layer signal network which is corresponding to the lower-layer media network where the media channel exists after the media channel is successfully established.

In a case where any two nodes are directly connected with each other merely by optical fiber, the traffic engineering link, the available frequency spectrum of which is the same as available frequency spectrum of the optical fiber, is formed in an upper-layer signal network which is corresponding to the lower-layer media network where the media channel exists.

In an example embodiment, as shown in FIG. 1, after Step S104 is executed, that is, after the signal channel is established between the third node and the fourth node, to guarantee the right-to-know of each node, the flow further includes: switching, on the nodes the signal channel passes, the plurality of split 50 GHz frequency spectrums which bear one optical channel.

To guarantee the right-to-know of each node, after Step S102 is executed, that is, after the media channel is established between the first node and the second node, frequency slots are switched on the nodes the media channel passes. The frequency slot is a fixed or flexible grid. The type of the grid selected by the frequency slot and the split frequency spectrum depends on the actual situation. The frequency slot is a fixed or flexible grid.

In the implementation process, after the media channel is established, the available frequency spectrum of the optical fiber is released to a control plane via a routing protocol in the lower-layer media network where the media channel exists, wherein the optical fiber supports at least one frequency slot; and correspondingly, after the media channel is established, the available frequency spectrum of the traffic engineering link is released to a control plane via a routing protocol in the upper-layer signal network which is corresponding to the lower-layer media network, wherein the traffic engineering link supports at least one optical channel.

The routing protocol here includes Open Shortest Path First (OSPF)-Traffic Engineering (OSPF-TE) and Intermediate system to Intermediate System (ISIS)-Traffic Engineering (ISIS-TE).

Figure 2:
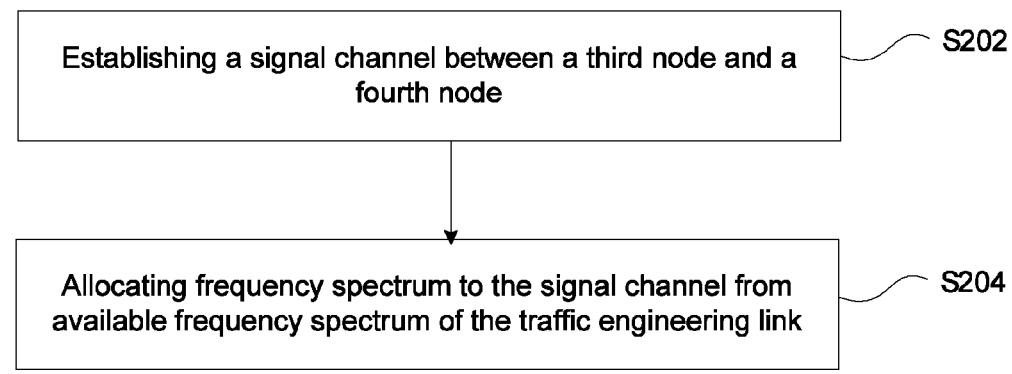
FIG. 2 is a flowchart illustrating the processing flow of a second channel establishment method according to an embodiment of the disclosure.

Based on the same inventive concept, another channel establishment method is provided in an embodiment of the disclosure which, as shown in FIG. 2, includes:

Step S202: establishing a signal channel between a third node and a fourth node;

wherein the third node is the source node of the signal channel, the fourth node is the destination node of the signal channel, and the signal channel passes a frequency slot matrix of one or more intermediate nodes between the third node and the fourth node and a traffic engineering link between any two nodes;

Step S204: allocating frequency spectrum to the signal channel from available frequency spectrum of the traffic engineering link, wherein the frequency spectrum allocated includes a plurality of split 50 GHz frequency spectrums which bear one optical channel and each of which only contains a single optical carrier.

Figure 3:
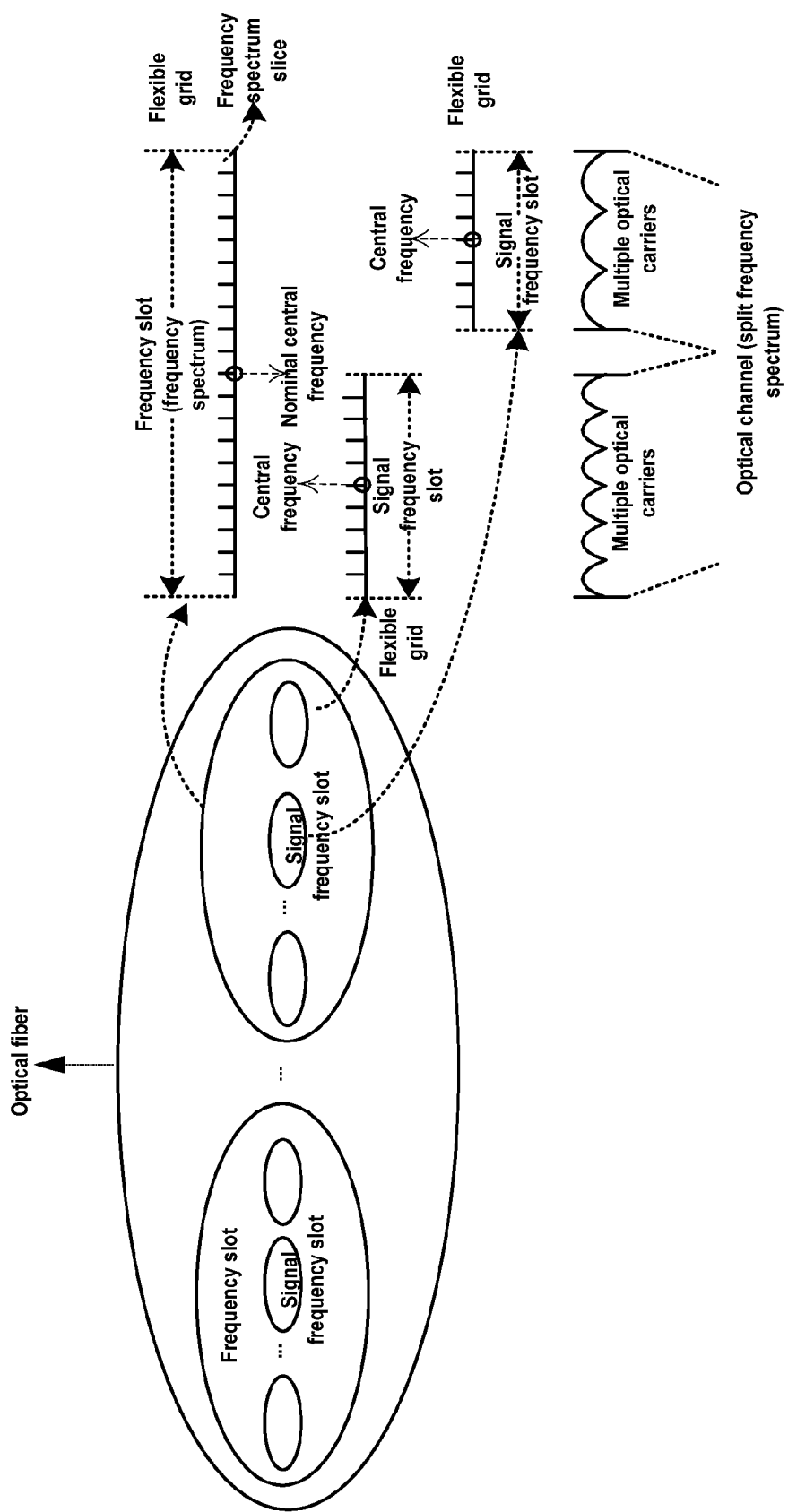
FIG. 3 is a schematic diagram illustrating the management on the frequency spectrum of an optical network using a hierarchical concept according to an embodiment of the disclosure.
Figure 4:
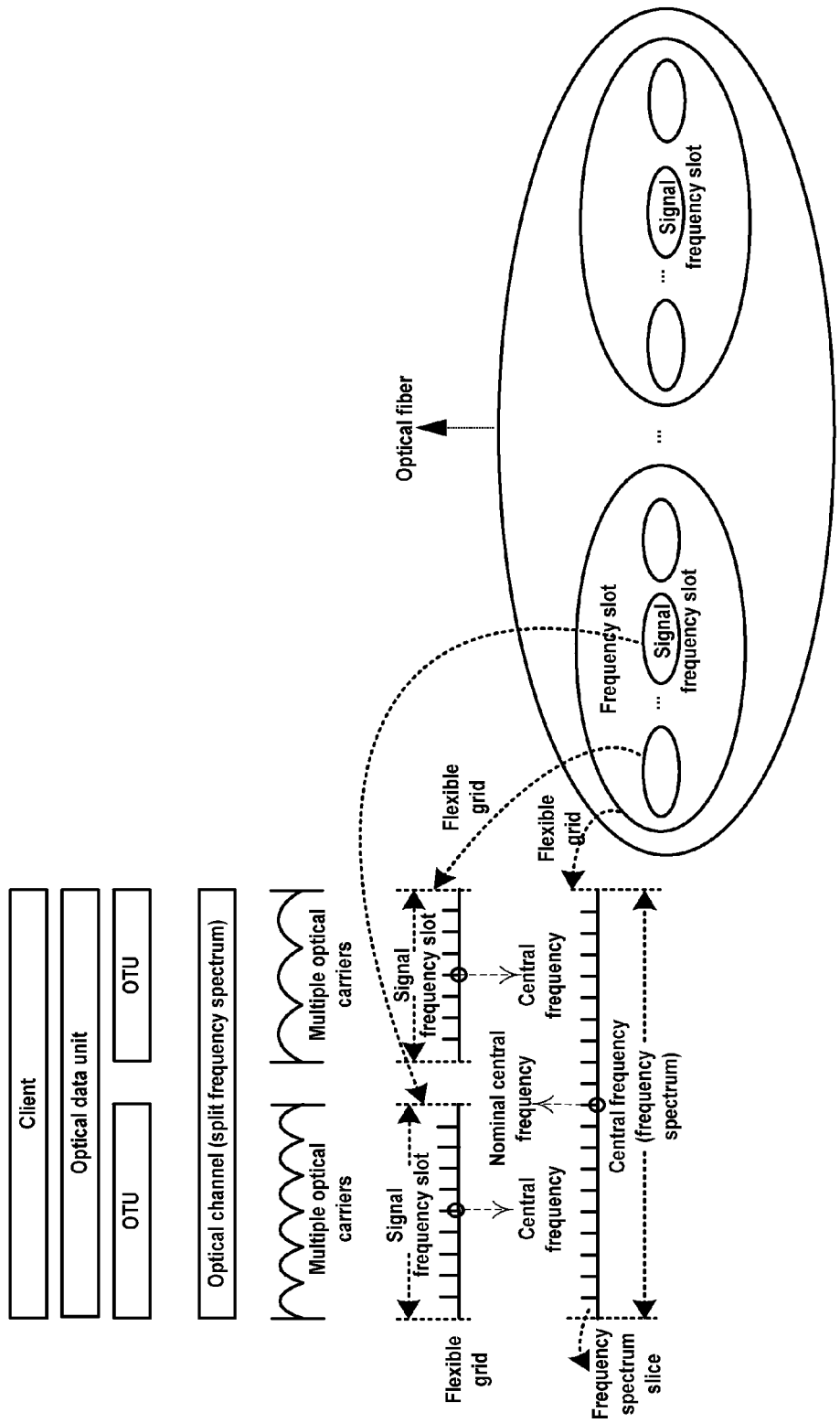
FIG. 4 is a schematic diagram illustrating the mapping of a client signal to a signal channel when the frequency spectrum of an optical network is managed using a hierarchical concept according to an embodiment of the disclosure.

After being illustrated theoretically, the idea of the disclosure is described below with reference to drawings. FIG. 3 illustrates the idea of the disclosure based on which the frequency spectrum of an optical network is managed using a hierarchical concept, and as shown in FIG. 3, the service layer is frequency slot, the client layer is optical channel (OCh), an OCh is born by a plurality of split frequency spectrums in a signal channel, and each split frequency spectrum includes one or more optical carriers, and an optical fiber is capable of supporting a plurality of frequency slots, thus, the operator may create a plurality of media channels each of which occupies a frequency slot when passing the optical fiber, moreover, each frequency slot is a flexible or fixed grid which is described with a normal central frequency and a frequency spectrum width consisting of frequency spectrum slices of the same size. Such a frequency slot can further support a plurality of split frequency slots each of which is described with a central frequency and a frequency spectrum width consisting of frequency spectrum slices of the same size. The OCh can be born by a plurality of split 50 GHz frequency slots each of which only includes one optical carrier. From the perspective of frequency spectrum management, the disclosure manages, plans and configures the frequency spectrum of an optical network using a hierarchical frequency spectrum management technology. When the frequency spectrum of an optical network is managed using a hierarchical concept, as shown in FIG. 4 which illustrates the feedback of a client signal to a signal channel, a client signal is mapped to an Optical Data Unit (ODUk), the ODUk is mapped to different Optical Channel Transport Units (OTUk) through interleave multiplexing, and each OTUk is mapped to a frequency slot.

In the implementation process, after the media channel is established, the available frequency spectrum of the optical fiber is released to a control plane via a routing protocol in the lower-layer media network where the media channel exists, wherein the optical fiber supports at least one frequency slot; and correspondingly, after the media channel is established, the available frequency spectrum of the traffic engineering link is released to a control plane via a routing protocol in the upper-layer signal network which is corresponding to the lower-layer media network, wherein the traffic engineering link supports at least one OCh.

The routing protocol here includes Open Shortest Path First (OSPF)-Traffic Engineering (OSPF-TE) and Intermediate system to Intermediate System (ISIS)-Traffic Engineering (ISIS-TE).

Figure 5:
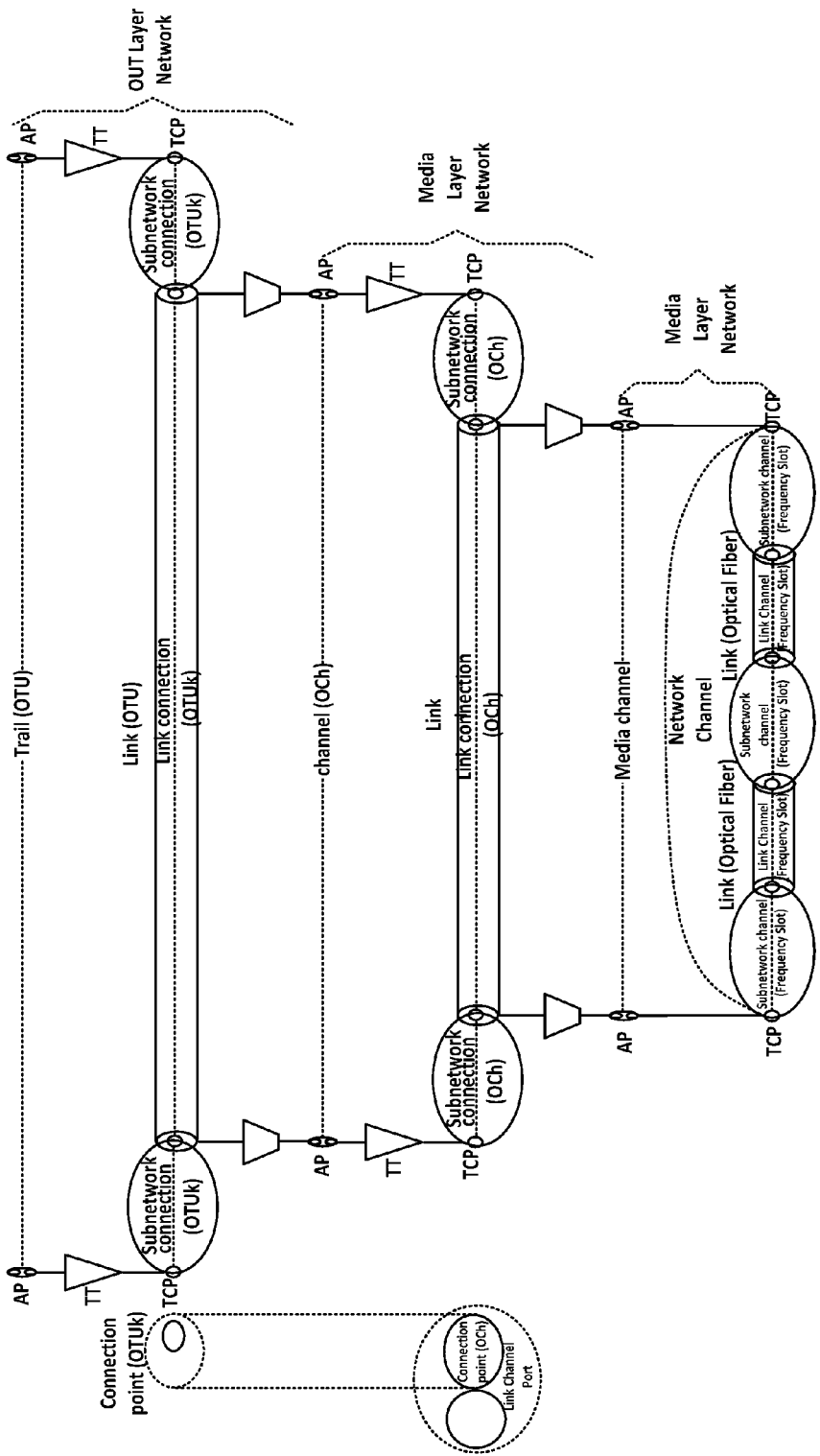
FIG. 5 is a schematic diagram illustrating the architecture of the hierarchical frequency spectrum management of an optical network according to an embodiment of the disclosure.

FIG. 5 illustrates the architecture of the hierarchical frequency spectrum management of an optical network after the channel establishment method provided herein and a corresponding frequency spectrum management mode are adopted according to an embodiment of the disclosure, and in the architecture shown in FIG. 5, a media layer network is divided into two layers of network sub-layers, that is, a media channel and a signal channel (that is, an OCh). The media channel is formed by connecting an Access Point (AP), a Termination Connection Point (TCP), the sub-network Channel of a frequency slot, a connection point and the link channel of a frequency slot in series and may pass an intermediate node, the optical fiber between nodes and the frequency slot matrix of a node; after the media channel is created, a traffic engineering link is formed in an upper-layer signal network; and the signal channel (that is, the OCh) is formed by connecting an AP, a Trail Termination (TT), a Termination Connection Point (TCP), the sub-network connection of an OCh, a connection point and the link connection of an OCh in series.

Figure 6:
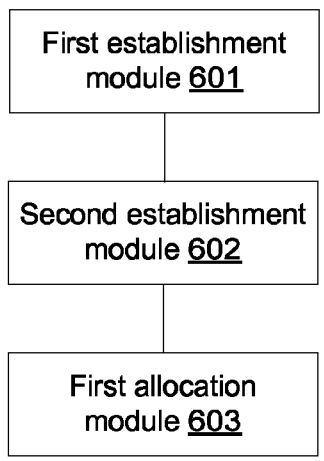
FIG. 6 is a schematic diagram illustrating the structure of a first channel establishment device according to an embodiment of the disclosure.

To support any of the example embodiments described above, a channel establishment device is provided in an embodiment of the disclosure which, as shown in FIG. 6, structurally includes:

a first establishment module 601 configured to establish a media channel between a first node and a second node, wherein the first node is the source node of the media channel, the second node is the destination node of the media channel, the media channel passes a frequency slot matrix of one or more intermediate nodes between the first node and the second node and an optical fiber between any two nodes, and the media channel supports at least one optical channel;

a second establishment module 602 connected with the first establishment module 601 and configured to establish a signal channel between a third node and a fourth node after the media channel is established, wherein the third node is the source node of the signal channel, the fourth node is the destination node of the signal channel, and the signal channel passes a frequency slot matrix of one or more intermediate nodes between the third node and the fourth node and a traffic engineering link between any two nodes; and a first allocation module 603 connected with the second establishment module 602 and configured to allocate frequency spectrum to the signal channel from the available frequency spectrum of the traffic engineering link, wherein the frequency spectrum allocated includes a plurality of split 50 GHz frequency spectrums which bear one optical channel and each of which only contains a single optical carrier.

Figure 7:
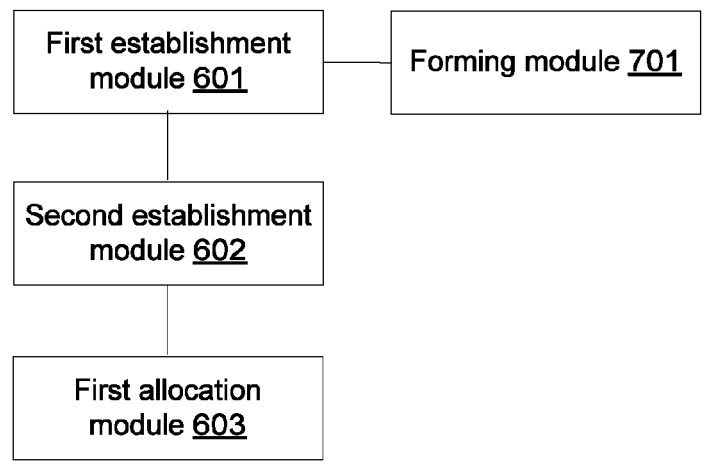
FIG. 7 is a schematic diagram illustrating the structure of a second channel establishment device according to an embodiment of the disclosure.

In an example embodiment, as shown in FIG. 7, the channel establishment device may further include:

a forming module 701 configured to form, between the first node and the second node, a traffic engineering link which supports at least one signal channel and the available frequency spectrum of which is the same as the frequency spectrum of the media channel in an upper-layer signal network which is corresponding to the lower-layer media network where the media channel exists after the media channel is successfully established by the first establishment module 601.

Figure 8:
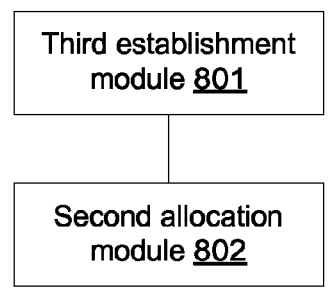
FIG. 8 is a schematic diagram illustrating the structure of a third channel establishment device according to an embodiment of the disclosure.

Based on the same inventive concept, another channel establishment device is provided in an embodiment of the disclosure which, as shown in FIG. 8, structurally includes:

a third establishment module 801 configured to establish a signal channel between a third node and a fourth node, wherein the third node is the source node of the signal channel, the fourth node is the destination node of the signal channel, and the signal channel passes a frequency slot matrix of one or more intermediate nodes between the third node and the fourth node and a traffic engineering link between any two nodes; and a second allocation module 802 connected with the third establishment module 801 and configured to allocate frequency spectrum to the signal channel from the available frequency spectrum of the traffic engineering link, wherein the frequency spectrum allocated includes a plurality of split 50 GHz frequency spectrums which bear one optical channel and each of which only contains a single optical carrier.

To set forth the channel establishment method provided in embodiments of the disclosure more clearly and more plainly, the channel establishment methods provided herein are described below with reference to specific embodiments.

Embodiment 1

An end-to-end channel establishment method is provided in the embodiment, which specifically includes the following processing steps.

One media channel which can pass frequency slot matrixes of a plurality of intermediate nodes and the optical fiber between nodes is created between two nodes, the available frequency spectrum of the optical fiber is allocated to the media channel, and one or more frequency slots are switched on the intermediate nodes the media channel passes.

The media channel is capable of supporting more than one OCh. One traffic engineering link is formed in an upper-layer signal network after the media channel is created. A plurality of signal paths may pass the traffic engineering link formed by the media path in the upper-layer network.

A signal channel which can pass single signal frequency slot matrixes of a plurality of intermediate nodes and the traffic engineering links between a plurality of nodes is created between two nodes, the available frequency spectrum of the traffic engineering links between the plurality of nodes is allocated to the signal channel, and a plurality of split 50 GHz frequency spectrums which bear one OCh are switched on the intermediate nodes the signal channel passes.

The frequency slot may be a fixed or flexible grid. Each split 50 GHz frequency spectrum is a fixed grid.

A traffic engineering link the available frequency spectrum of which is the same as the frequency spectrum of the media channel is formed in an upper-layer signal network after the media channel is created.

A traffic engineering link may be directly formed in the upper-layer signal network when two nodes are directly connected via an optical fiber in a media network layer, wherein the maximum available frequency spectrum of the traffic engineering link is equal to available frequency spectrum of the optical fiber of a lower-layer media network.

In the media network layer, the available frequency spectrum supported by the optical fiber is released to a control plane via a routing protocol. The optical fiber can support a plurality of frequency slots.

In a signal network layer, the available frequency spectrum supported by the traffic engineering link is released to a control plane via a routing protocol. The traffic engineering link can support a plurality of single signal frequency slots. The routing protocol includes OSPF-TE and ISIS-TE.

Embodiment 2

Figure 9:
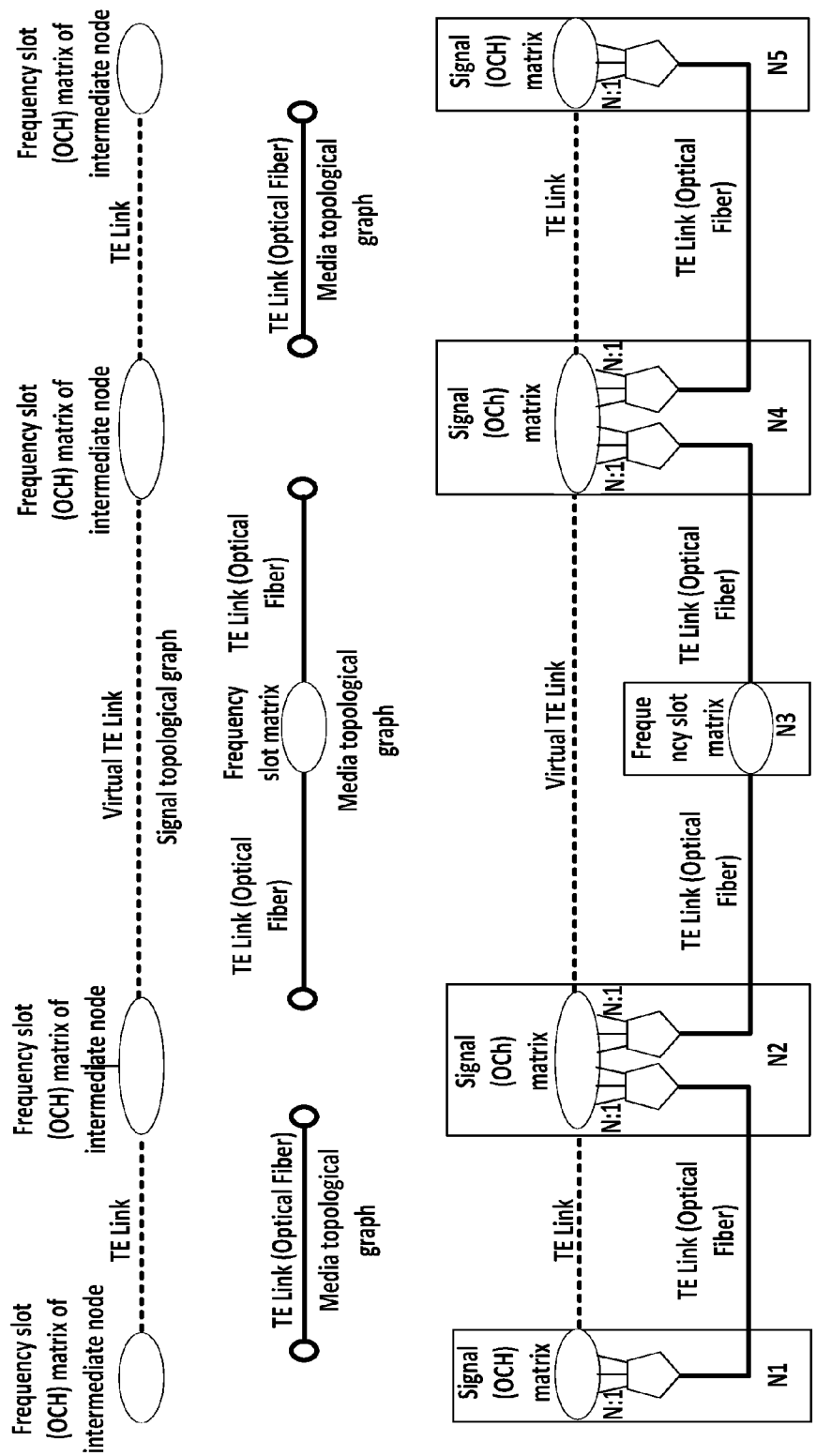
FIG. 9 is a topological graph illustrating the hierarchical frequency spectrum management of an optical network according to an embodiment of the disclosure.

An end-to-end channel establishment method is provided in the embodiment in combination with specific nodes in a network. FIG. 9 is a topological graph illustrating the hierarchical frequency spectrum management of an optical network, and FIG. 10 schematically illustrates an embodiment of the hierarchical frequency spectrum management of an optical network according to an embodiment of the disclosure.

Figure 10:
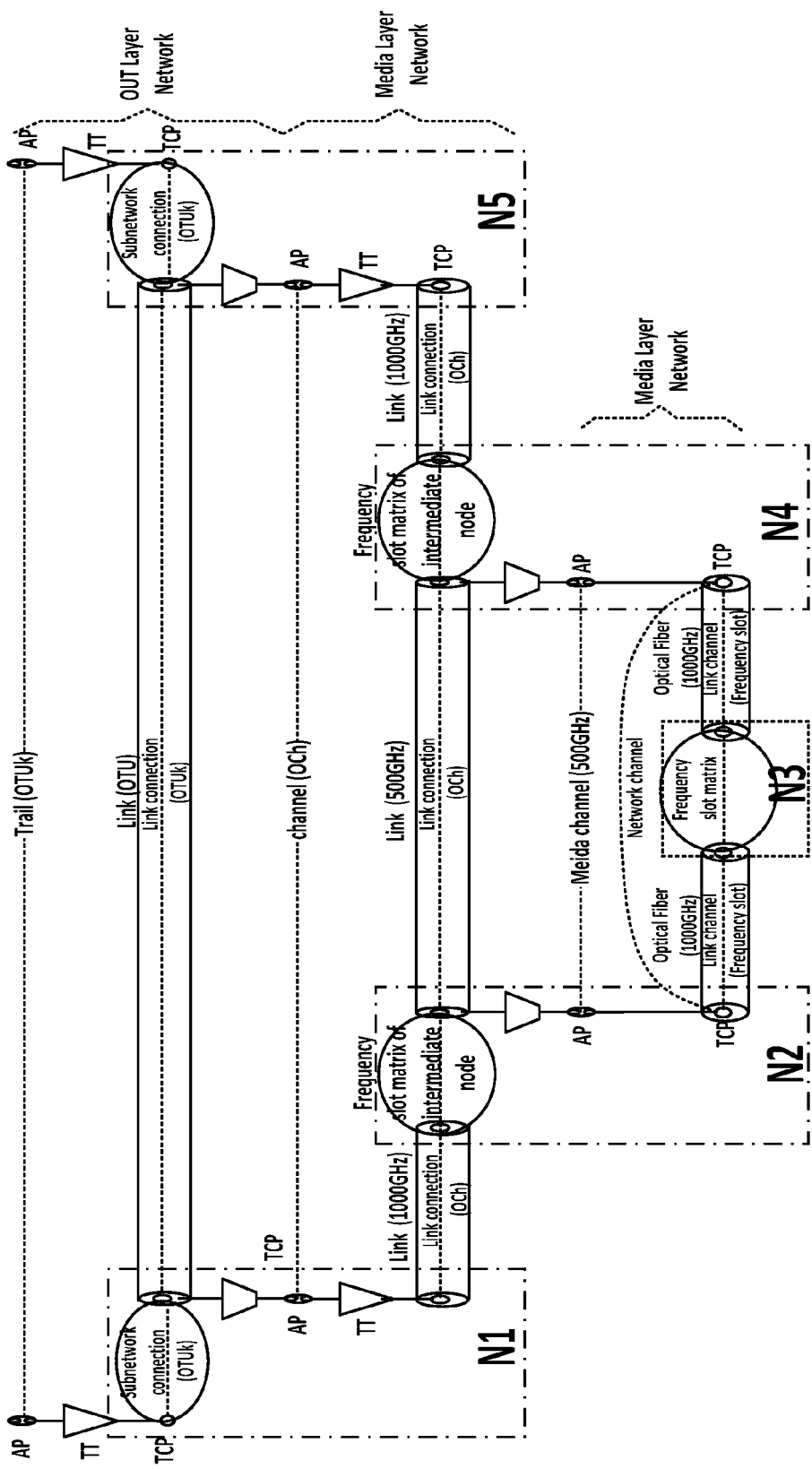
FIG. 10 is a schematic diagram illustrating an embodiment of the hierarchical frequency spectrum management of an optical network according to an embodiment of the disclosure.

As shown in FIG. 10, in the media network layer, the available frequency spectrum (e.g. the 1000 GHz available frequency spectrum shown in FIG. 10) of a frequency slot supported by an optical fiber is released to a control plane via a routing protocol. As shown in FIG. 10, the optical fiber can support a plurality of frequency slots.

A media channel which can pass frequency slot matrixes of a plurality of intermediate nodes (e.g. N3) and the optical fiber between nodes is created between two nodes (e.g. N2 and N4), the available frequency spectrum of the optical fiber is allocated to the media channel (e.g. 500 GHz frequency spectrum is allocated to the media channel), and frequency slots are switched on the intermediate nodes the media channel passes. The frequency slot may be a fixed or flexible grid.

As shown in FIG. 10, the media channel can support more than one OCh, each OCh can be born by a plurality of split 50 GHz frequency slots each of which is fixed grid merely including one optical carrier.

A traffic engineering link the available frequency spectrum of which is 500 GHz, for example, the Virtual TE link shown in FIG. 10 between nodes N2 and N4, is formed in an upper-layer signal network after the media channel is created. A plurality of signal paths may pass the traffic engineering link formed by the media path in the upper-layer network. The available frequency spectrum of the traffic engineering link is the same as the frequency spectrum of the media channel.

In a signal network layer, the available frequency spectrum (that is, 500 GHz) of the traffic engineering link is released to a control plane via a routing protocol. The traffic engineering link can support a plurality of OChs.

A traffic engineering link can be directly formed in the upper-layer signal network when two nodes are directly connected via an optical fiber in a media network layer, wherein the available frequency spectrum of the traffic engineering link is 1000 GHz, equal to available frequency spectrum of the optical fiber of the lower-layer media network, and as shown in FIG. 10, the optical fiber between N1 and N2 and the optical fiber between N4 and N5 can directly form two traffic engineering links in the signal layer network.

In this way, in the signal layer network, related topological information, including a frequency slot matrix and a traffic engineering link, can be seen by a path computation element.

After the traffic engineering link is formed, a signal channel which can pass frequency slot matrixes of a plurality of intermediate nodes and the traffic engineering links between the plurality of nodes is created between two nodes, the available frequency spectrum of the traffic engineering links between the plurality of nodes is allocated to the signal channel, and a plurality of split 50 GHz frequency spectrums which bear one OCh are switched on the intermediate nodes the signal channel passes.

Embodiment 3

A method of establishing an end-to-end frequency spectrum channel through a management plane or control plane is provided in the embodiment from the aspects of flow and examples, the processing flow of the method including the following steps S1 to S7.

Step S1: a management or control plane obtains the topology structure of an optical network (including the nodes in the network and the optical fibers between nodes) and detailed information of each optical fiber (link), the information including the available frequency spectrum (including the available central frequency and the width of the frequency spectrum) supported by the link.

Step S2: a path computation entity (e.g., a Path Computation Element (PCE)) of the management or control plane computes the end-to-end route of a media channel using the topology information obtained in Step S1 to obtain the route of an end-to-end media channel.

For example, as shown in FIG. 10, the PCE calculates the route of the media channel which is located between nodes N2 and N4 and the frequency spectrum of which is 500 GHz, the media channel passing the optical fiber between nodes N2 and N3 and the optical fiber between nodes N3 and N4 and the frequency slot matrix of the node N3.

Step S3: after the route computation is completed, the nodes, the link the media channel passes and the frequency spectrum needed by the link are determined, an end-to-end media channel is established through the signaling of the management or control plane, frequency slots are switched on the intermediate nodes the end-to-end media channel passes, and the available frequency spectrum of the optical fiber is allocated to the media channel.

As shown in FIG. 10, a media channel is established through the signaling of the management or control plane after the route computation is completed, the 500 GHz frequency spectrum of the optical fiber is allocated to the media channel, and one or more frequency slots are switched on the node N3.

Step S4: the media channel can support more than one OCh, each OCh can be born by a plurality of split 50 GHz frequency slots each of which is fixed grid merely including one optical carrier. For example, an OCh may be born by two split frequency slots the frequency spectrums of which are both 50 GHz and between which a guard band exists. A traffic engineering link is formed in an upper-layer signal network after the media channel is created. A plurality of signal paths may pass the traffic engineering link formed by the media path in the upper-layer network. The available frequency spectrum of the traffic engineering link is the same as the frequency spectrum of the media channel.

As shown in FIG. 10, after a 500 GHz media channel is created between nodes N2 and N4, a traffic engineering link is created between nodes N2 and N4 in the upper-layer signal network, wherein the maximum available frequency spectrum of the traffic engineering link is 500 GHz. The traffic engineering link can be passed by a plurality of signal channels, for example, a plurality of 100 G signal channels.

Step S5: a traffic engineering link can be directly formed in the upper-layer signal network when two nodes are directly connected via an optical fiber in a media network layer, wherein the available frequency spectrum of the traffic engineering link is equal to available frequency spectrum of the optical fiber of a lower-layer media network.

As shown in FIG. 10, two traffic engineering links are directly formed between the nodes N1 and N2 and between the nodes N4 and N5 in the upper-layer signal network when nodes N1 and N2 and nodes N4 and N5 are both directly connected via an optical fiber, wherein the available frequency spectrum of the traffic engineering link is 1000 GHz, equal to available frequency spectrum of the optical fiber.

Step S6: the PCE of the management or control plane computes an end-to-end signal channel route using the topology information obtained in Steps S4 and S5 to obtain the route of an end-to-end signal channel.

As shown in FIG. 10, the PCE computes a signal channel route between nodes N1 and N5, the signal channel, the rate of which is 400 G, passes the traffic engineering link between nodes N1 and N2, the traffic engineering link between nodes N4 and N5, the traffic engineering link between nodes N2 and N4 and single signal frequency slot matrixes of nodes N2 and N4.

Step S7: after the route is computed, the nodes, the link the signal channel passes and the frequency spectrum needed by the link are determined, the end-to-end signal channel is established through signaling of the management or control plane, frequency slots are switched on the intermediate node the end-to-end signal channel passes, and the available frequency spectrums, for example, two 50 GHz split frequency spectrums, of the traffic engineering link are allocated to the signal channel.

As shown in FIG. 10, a signal channel is established through signaling of the management or control plane after the route computation is completed, two 50 GHz frequency spectrums of the traffic engineering links between nodes N1 and N2, between nodes N2 and N4 and between nodes N4 and N5 are allocated to the signal channel, and two split 50 GHz frequency spectrums which bear one OCh are switched on the nodes N2 and N4.

INDUSTRIAL APPLICABILITY

The embodiments of the disclosure put emphasis on providing a frequency spectrum resource management method and system to improve the utilization rate of frequency spectrum and rationally plan frequency spectrum resource after a flexible grid technology is introduced into a beyond-100 G system, thereby improving the overall frequency spectrum utilization rate of the network of the operator and effectively reducing the network management and investment cost of the operator.

It can be seen from the description above that the embodiments described herein achieve the following technical effects.

In the embodiments of the disclosure, a media channel is established between a first node and a second node, a signal channel is established between a third node and a fourth node after the media channel is successfully established, frequency spectrum is allocated to the signal channel from the available frequency spectrum of a traffic engineering link, and the frequency spectrum allocated includes a plurality of split 50 GHz frequency spectrums which bear one optical channel and each of which includes one or more optical carriers. As a result, the separation of a media channel from a signal channel provides hierarchical management, moreover, as a signal channel can be born by a plurality of split 50 GHz frequency spectrums each of which includes one or more optical carriers, hierarchical management and planning is provided from the point of view of frequency spectrum management. This frequency spectrum management mode can improve the utilization rate of frequency spectrum, rationally plan frequency spectrum resource and achieve an extremely high waveband frequency spectrum efficiency while being compatible to the 50 GHz spacing technology adopted by existing 10 G/40 G/100 G transmission technologies after a flexible grid technology is introduced into a beyond-100 G system, thus protecting the investment of operator, improving the overall frequency spectrum utilization rate of the network of the operator and effectively reducing the network management and investment cost of the operator.

Apparently, it should be appreciated by those skilled in the art that each module or step described in the invention can be realized by a universal computer and that the modules or steps may be integrated on a single computer or distributed on a network consisting of a plurality of computers, optionally, the modules or steps may be realized by executable program codes so that the modules or steps can be stored in a memory to be executed by a computer, and in some cases, the steps shown or described herein can be executed in a sequence different from this presented herein, or the modules or steps are formed into integrated circuit modules, or several of the modules or steps are formed into integrated circuit modules. Therefore, the invention is not limited to the combination of specific hardware and software.

The mentioned above is only example embodiments of the invention but not limitation to the invention, it should be appreciated that various modification and variations can be devised by those of ordinary skill in the art. Any modification, substitute or improvement devised without departing from the scope of the disclosure should fall within the protection scope of the appended claims of the disclosure.

What is claimed is:

1. A channel establishment method, comprising:
    establishing a signal channel between a third node and a fourth node, wherein the third node is a source node of the signal channel, the fourth node is a destination node of the signal channel, and the signal channel passes a frequency slot matrix of one or more intermediate nodes between the third node and the fourth node and a traffic engineering link between any two nodes; and
    allocating frequency spectrum to the signal channel from available frequency spectrum of the traffic engineering link, wherein the frequency spectrum allocated comprises a plurality of split frequency spectrums which bear one optical channel and each of which contains a plurality of optical carriers or only contains a single optical carrier.

2. The method according to claim 1, wherein before establishing the signal channel between the third node and the fourth node, the method further comprises:
    establishing a media channel between a first node and a second node, wherein the first node is a source node of the media channel, the second node is a destination node of the media channel, the media channel passes a frequency slot matrix of one or more intermediate nodes between the first node and the second node and an optical fiber between any two nodes, and the media channel supports at least one optical channel.

3. The method according to claim 2, wherein frequency spectrum of the media channel is allocated from available frequency spectrum of the optical fiber.

4. The method according to claim 2, wherein the number of the optical carriers contained in each split frequency spectrum is able to be dynamically increased or reduced.

5. The method according to claim 2, wherein the traffic engineering link is formed in the following manner:
    after the media channel is successfully established, the traffic engineering link, which supports at least one signal channel, and the available frequency spectrum of which is the same as the frequency spectrum of the media channel, is formed between the first node and the second node in an upper-layer signal network which is corresponding to a lower-layer media network where the media channel exists.

6. The method according to claim 2, wherein the traffic engineering link is formed in the following manner:
    in a case where any two nodes are directly connected with each other merely by an optical fiber, one traffic engineering link, the available frequency spectrum of which is the same as available frequency spectrum of the optical fiber, is formed in an upper-layer signal network which is corresponding to a lower-layer media network where the media channel exists.

7. The method according to claim 2, wherein after the signal channel is established between the third node and the fourth node, the method further comprises: switching, on nodes the signal channel passes, the plurality of split frequency spectrums which bear one optical channel.

8. The method according to claim 7, wherein each split frequency spectrum is a fixed or flexible grid.

9. The method according to claim 8, wherein the frequency slot is a fixed or flexible grid.

10. The method according to claim 2, wherein after the media channel is established between the first node and the second node, the method further comprises: switching one or more frequency slots on nodes the media channel passes.

11. The method according to claim 2,
    wherein the available frequency spectrum of the optical fiber is released to a control plane via a routing protocol in a lower-layer media network where the media channel exists, wherein the optical fiber supports at least one frequency slot; and
    the available frequency spectrum of the traffic engineering link is released to a control plane via a routing protocol in an upper-layer signal network which is corresponding to the lower-layer media network, wherein the traffic engineering link supports at least one optical channel.

12. The method according to claim 11, wherein the routing protocol comprises Open Shortest Path First (OSPF)-Traffic Engineering (OSPF-TE) and Intermediate System to Intermediate System (ISIS)-Traffic Engineering (ISIS-TE).

13. The method according to claim 1, wherein the number of the optical carriers contained in each split frequency spectrum is able to be dynamically increased or reduced.

14. The method according to claim 1, wherein the traffic engineering link is formed in the following manner:
    after the media channel is successfully established, the traffic engineering link, which supports at least one signal channel, and the available frequency spectrum of which is the same as the frequency spectrum of the media channel, is formed between the first node and the second node in an upper-layer signal network which is corresponding to a lower-layer media network where the media channel exists.

15. The method according to claim 1, wherein the traffic engineering link is formed in the following manner:
    in a case where any two nodes are directly connected with each other merely by an optical fiber, one traffic engineering link, the available frequency spectrum of which is the same as available frequency spectrum of the optical fiber, is formed in an upper-layer signal network which is corresponding to a lower-layer media network where the media channel exists.

16. The method according to claim 1, wherein after the signal channel is established between the third node and the fourth node, the method further comprises: switching, on nodes the signal channel passes, the plurality of split frequency spectrums which bear one optical channel.

17. The method according to claim 16, wherein each split frequency spectrum is a fixed or flexible grid.

18. A channel establishment device, comprising:
    a third establishment module configured to establish a signal channel between a third node and a fourth node, wherein the third node is a source node of the signal channel, the fourth node is a destination node of the signal channel, and the signal channel passes a frequency slot matrix of one or more intermediate nodes between the third node and the fourth node and a traffic engineering link between any two nodes; and a second allocation module configured to allocate frequency spectrum to the signal channel from available frequency spectrum of the traffic engineering link, wherein the frequency spectrum allocated comprises a plurality of split frequency spectrums which bear one optical channel and each of which contains a plurality of optical carriers or only contains a single optical carrier.

19. The device according to claim 18, further comprising:
a first establishment module configured to, before the third establishment module establishes the signal channel between the third node and the fourth node, establish a media channel between a first node and a second node, wherein the first node is a source node of the media channel, the second node is a destination node of the media channel, the media channel passes a frequency slot matrix of one or more intermediate nodes between the first node and the second node and an optical fiber between any two nodes, and the media channel supports at least one optical channel.

20. The device according to claim 19, further comprising:
a forming module configured to, after the media channel is successfully established by the first establishment module, form, between the first node and the second node, a traffic engineering link which supports at least one signal channel and available frequency spectrum of which is the same as the frequency spectrum of the media channel in an upper-layer signal network which is corresponding to a lower-layer media network where the media channel exists.

* * * * *